May 17, 1966     M. A. POPELIER     3,251,493
BUCKET LEVEL INDICATOR
Filed Nov. 13, 1964
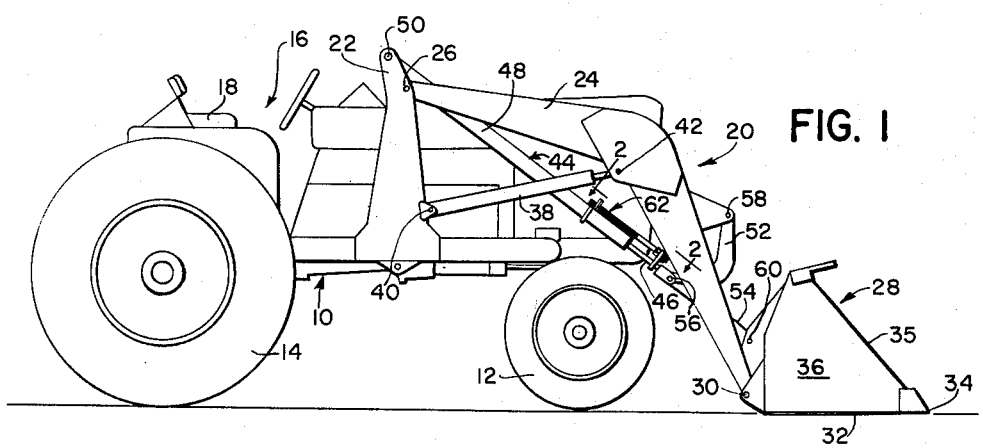
FIG. 1
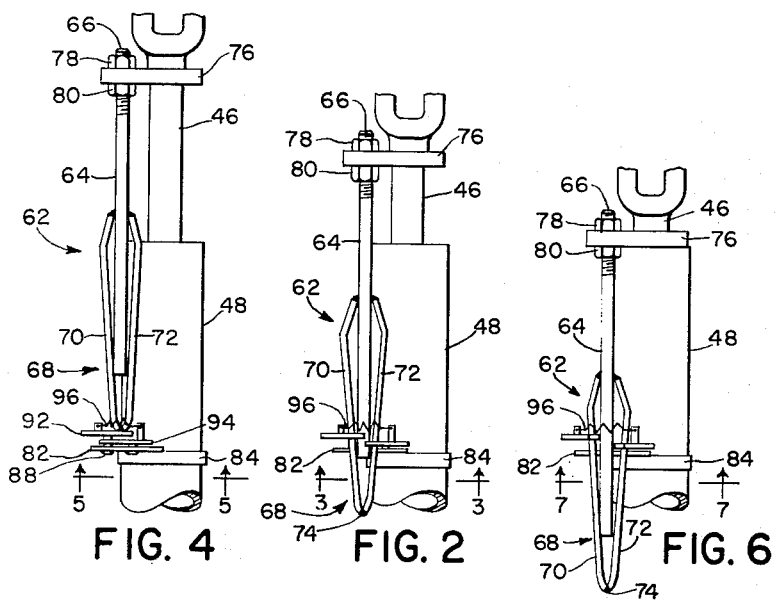
FIG. 4     FIG. 2     FIG. 6
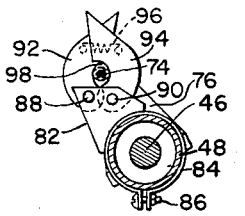    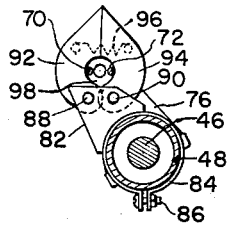    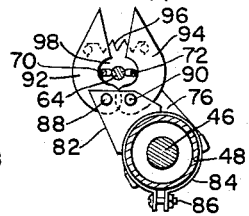
FIG. 5     FIG. 3     FIG. 7
*INVENTOR.*
M. POPELIER
BY
John M. Nolan
ATTORNEY

United States Patent Office 3,251,493
Patented May 17, 1966

3,251,493
BUCKET LEVEL INDICATOR
Maurice A. Popelier, East Moline, Ill., assignor to Deere & Company, Moline, Ill., a corporation of Delaware
Filed Nov. 13, 1964, Ser. No. 410,981
13 Claims. (Cl. 214—140)

This invention relates to a position-indicating device and more particularly to a device for indicating the position of a tiltable material-handling implement on a vehicle mounted power loader.

The device will be described for use on a tractor mounted front end loader, although it is to be understood that the device can be used on other types of loaders. Such loaders generally include a vertically swingable, forwardly extending boom arm, pivotally mounted on a tractor, and a bucket tiltable about a horizontal pivot carried by the end of the boom arm. Separate hydraulic rams are used to control the positions of the boom arm and the bucket around their respective pivots. In many loaders of this type, the boom arm and bucket-control linkages are connected to the bucket and the tractor frame to form a distorted parallelogram. This type of linkage makes a bucket approximately self leveling, the bottom of the bucket maintaining approximately the same angle relative to the ground for any position of the boom arm, the bucket moving relative to the boom arm as the boom arm raises and lowers.

Since the loader extends forwardly from the tractor and the operator's station is generally located on the tractor to the rear of the loader mechanism, the operator often finds it difficult to observe the bucket due to visual obstruction by the loader mechanism and the front portion of the tractor, especially when the bucket is at a low level. Thus, the operator experiences difficulty in setting the bucket in the desired position relative to the ground.

One device, as decribed in U.S. Patent No. 3,017,046, comprises a pointer movable relative to a stationary indicia by cam means actuated by the piston of the bucket control ram. However, this indicator only operates in a narrow range when the bucket is approximately level and also becomes difficult to see if the indicia become obscured with dirt or grease.

The present invention is an improvement in such devices. It provides an indicator operable over the entire range of bucket positions. It also offers improved visual characteristics by eliminating the stationary indicia, the position of the bucket being indicated by the relative positions of two movable pointers.

Accordingly, an object of the present invention is to provide a device for indicating the position of a tiltable material-handling implement on a vehicle mounted power loader.

Another object is to provide such a device which indicates the extension of the piston in the material handling implement control ram.

Another object is to provide such a device which is effective over the entire range of implement positions.

Another object is to provide such an indicator having improved visual characteristics, the indicator being clearly visible to the operator at any position of the implement or boom arm. Another object is to provide such a device utilizing a pair of movable pointers which indicate the position of the material-handling implement by the relative position of the pointers.

Another object is to make the pointers easily adjustable to provide the desired relative positions for any given position of the material-handling implement.

Still another object is to provide such a device easy and inexpensive to manufacture and maintain and easily furnished as original equipment or later installed as an attachment on a power loader.

These and other objects of the invention will become apparent from the consideration of the detailed description and drawings which follow wherein a specific embodiment of the invention is described.

In the drawings:

FIG. 1 is a side elevation view of a typical tractor mounted power loader, with the bucket in level position.

FIG. 2 is an enlarged view of the indicating device as seen along the line 2—2 of FIG. 1.

FIG. 3 is a section view taken along line 3—3 of FIG. 2.

FIG. 4 is the same view as FIG. 2, when the bucket is in an open position.

FIG. 5 is a section view taken along line 5—5 of FIG. 4.

FIG. 6 is the same view as FIG. 2 when the bucket is in a closed position.

FIG. 7 is a section view taken along line 7—7 of FIG. 6.

Referring now to the drawings, there is shown a tractor having a main frame indicated generally by the numeral 10, front and rear wheels, 12 and 14 respectively, and an operator's station 16 including a seat 18. A power loader 20 is attached to the frame and extends forwardly from the tractor. Although only one side of the tractor and power loader is shown in FIG. 1 and referred to herein, it is apparent to those skilled in the art that an identical structure is associated with the opposite side of the tractor and power loader.

The power loader includes an upwardly extending rigid support bracket 22 affixed to the tractor frame on the side of the tractor, forwardly from the operator's station. A rigid boom arm 24 is rockably mounted at one end to the upper portion of the support bracket around a horizontal pivot 26, for movement of the boom arm in a longitudinal vertical arc, and extends forwardly and downwardly from the pivot. The boom arm carries a bucket 28 at its forward end, the bucket also being movable in a longitudinal vertical arc about a horizontal pivot 30 carried by the end of the boom arm. The bucket 28 includes an open side 35 and a bottom 32, terminating in a horizontal cutting edge 34 along its front edge, between opposite sides 36.

A boom control hydraulic ram 38 has one end pivotally mounted to the support bracket 22 at 40 and the other end pivotally mounted to the boom arm at 42, for raising and lowering said boom arm.

A double acting hydraulic ram 44 controls the tilt of the bucket and includes a piston 46 actuatable within a cylinder 48, the cylinder end of the ram being swingably mounted to the support bracke for movement in a longitudinal vertical arc about a horizontal pivot 50 carried by the support bracket at its upper end. The piston end of the ram is pivotally connected to the ends of rigid links 52 and 54 at pivot 56, the link 52 having its other end pivotally connected to the boom arm at 58 and the rigid link 54 having its opposite end swingably mounted to the bucket 28 about a horizontal pivot 60 carried by the bucket. As is apparent from FIG. 1, parallel pivots 26, 30, 60, and 50 form the corners of a distorted parallelogram. When the boom arm is raised by actuating the ram 38, if the length of the ram 44 and consequently the distance between the pivots 50 and 60 is kept constant, it is apparent that the bucket will rotate in a clockwise direction about the pivot 30, tending to maintain the bucket bottom 32 at the same angle relative to the ground. However, since the pivots do not form a perfect parallelogram, there will be some change of angle in the bucket relative to the ground, especially during the first part of the raising. However, this movement is desirable to facilitate the breaking out of the load. During the intermediate portion of the raising, the bottom of the bucket will remain at a substantially constant angle relative to the ground to prevent the material from spilling from the bucket.

In FIG. 1, the boom arm is in a lowered position, and the bucket tilt ram 44 is in an intermediate position, the bottom of the bucket 32 being approximately level. If the ram is actuated to extend the piston as shown in FIG. 4, it is apparent that the bucket will rotate about the pivot 30 to an open position, the open side 35 of the bucket facing forwardly and downwardly. Conversely if the ram is actuated to retract the piston to the position shown in FIG. 6, the bucket will rotate in a counterclockwise direction about the pivot 30 to a closed position, the open side 35 of the bucket facing upwardly.

As is apparent from FIG. 1, the position of the bucket is difficult to observe from the operator's station 16 when the boom arm is in the lower position. A bucket level indicator 62 which is visible to the operator in all positions of the boom arm, is mounted to the bucket control ram 44 on one side of the vehicle. The bucket level indicator includes an elongated rod 64 extending parallel and adjacent to the cylinder 48 and the piston 46, the rod having a thread 66 at one end and carrying a cam surface 68 at the other end.

The cam surface comprises a pair of elongated cylindrical cam surface members 70 and 72 having one end affixed to opposite sides of the rod, each member projecting a relatively short distance from said opposite side and thereafter gradually tapering toward the rod and the opposite cam member, the members joining at their ends to form a point 74 beyond the end of the rod.

A bracket 76 extends transversely from the piston 46 adjacent to the pivot 56. The threaded end 66 of the rod 64 is inserted through a bore in the bracket and locked to said bracket by means of nuts 78 and 80 on said threaded end, said nuts seating on opposite sides of the bracket. A second bracket 82 is transversely affixed to the cylinder 48 by means of a strap 84 and a fastener 86. The bracket 82 carries transverse adjacent pivots 88 and 90 which are axially parallel to the rod 64 and the piston 46.

A pair of flat, approximately semicircular, indicators 92 and 94 have one end swingably mounted to pivots 88 and 90 respectively for movement in adjacent parallel planes, the straight edge of each indicator facing the other indicator. The free end of each indicator terminates in a point. The indicators are biased toward an overlapping position by a tension spring 96 having one end affixed to the indicator 92 and the other end affixed to the indicator 94. Each indicator has a semicircular groove on the straight side, said grooves forming an aperture 98 which is circular when the straight sides of the indicators are alined.

The rod 64 extends from the bracket 76 toward the rear of the tractor, the cam surface 68 of the rod being inserted into the aperture 98 which acts as a cam follower. When the bucket is open, the piston 46 is extended as shown in FIG. 4, and the point 74 of the cam surface seats in the aperture 98, the indicators overlapping to the position shown in FIG. 5. When the bucket is level, the piston 46 is withdrawn to the position shown in FIG. 2, the cam surface increasing the size of the aperture 98, as shown in FIG. 3, and thereby causing the indicator 94 to rotate in a clockwise direction about the pivot 90 and the indicator 92 to rotate in a counterclockwise direction about the pivot 88, the straight sides of the indicators being alined.

When the piston is further retracted to the position shown in FIG. 6, thereby moving the bucket to a closed position, the cam surface increases the size of the aperture 98, further rotating the indicators to the position shown in FIG. 7.

It is apparent that the effective length of the rod 64 can be changed by adjusting the nuts 78 and 80, thereby slightly changing the penetration of the cam surface into the aperture 98 and the relative positions of the indicators. Thus, the position of the indicators can be finely adjusted to the desired position when the bucket is exactly level. It is also apparent that greater adjustments can be made by loosening the straps 84 and sliding the bracket 82 along the cylinder 48.

Other features and advantages of the present invention will readily occur to those skilled in the art, as will many modifications and alterations in the preferred embodiment of the invention as described herein, all of which may be achieved without departing from the spirit and the scope of the invention.

What is claimed is:

1. A device for indicating the extension of a piston member relative to a cylinder member in a hydraulic ram comprising, cam means carried by one of said members and cam follower means engaging said cam means, said cam follower means being formed by a pair of adjacent indicators pivotally mounted on the other member for movement in adjacent parallel planes transverse to the axis of said piston member and operating to change the relative positions of said indicators in response to the relative movement of said piston member and cylinder member.

2. A device for indicating the extension of the piston member relative to the cylinder member in a hydraulic ram comprising, a pair of adjacent indicators pivotally mounted on one member for movement in adjacent parallel planes transverse to the axis of said piston and cylinder members, said indicators forming an aperture variable in size with the relative movement of the indicators, the indicators being biased toward opposite rotational movement ending to decrease the size of said apertures, and cam means carried by the other member including an inclined cam surface projecting through said aperture, the edge of said aperture forming a cam follower slidably engaging said cam surface for the movement of said indicators about their pivots relative to each other in response to the axial movement of the piston member relative to the cylinder member.

3. A device for indicating the extension of the piston relative to the cylinder in a hydraulic ram comprising, a pair of adjacent indicators pivotally mounted on said cylinder for movement about their pivots in adjacent parallel planes transverse to the axis of said pistons and cylinder, said indicators forming an aperture variable in size with the relative movement of the indicators, said indicators being biased toward opposite rotational movement tending to decrease the size of the aperture, and an elongated cam member having one end operatively connected to the piston and extending parallel to the axis of the piston and adjacent to the cylinder, the other end forming inclined cam surfaces converging toward said end, the cam surfaces seating on the edge of said aperture with the piston extended, the cam surfaces slidably projecting through and expanding said aperture as the piston retracts into the cylinder, moving said indicators in opposite rotational directions relative to each other.

4. A device for indicating the extension of the piston relative to the cylinder in a hydraulic ram comprising, a pair of adjacent indicators pivotally mounted on said cylinder for movement about their pivots in adjacent parallel planes transverse to the axis of said piston and cylinder each indicator forming opposite edges of an aperture extending transversely through said indicators, the aperture varying in size with the relative movement of the indicators, said indicators being biased toward opposite rotational movement tending to decrease the size of the aperture, and an elongated cam member having one end operatively connected to the piston and extending parallel to the axis of the piston adjacent to the cylinder, the other end forming opposite inclined cam surfaces converging toward the end, said opposite cam surfaces seating on opposite edges of said aperture with the piston extended, the cam surfaces slidably projecting through and expanding said aperture as the piston retracts into the cylinder, moving said indicator in opposite rotational directions about their pivots.

5. The invention defined in claim 4 wherein the cam member is longitudinally adjustably attached to a bracket carried by the piston for selectively varying length of the cam member between the bracket and the cam surface end of said member.

6. The invention defined in claim 5 wherein the indicators are flat and have one end mounted on adjacent parallel pivots transverse to the flat surface, the opposite ends forming a pointer, each pointer having a straight edge on opposite sides which is alined with the straight edge of the opposite pointer when the piston is in an intermediate position relative to the cylinder, the pointer ends overlapping when the piston is fully extended and separating when the piston is fully retracted.

7. In a vehicle mounted power loader having a boom pivotally connected at one end to the vehicle for movement in a longitudinal vertical arc, hydraulic means for moving said boom, a material-handling implement pivotally mounted at the other end of said boom for tilting movement in a longitudinal vertical arc, and hydraulic ram means for tilting said material-handling implement, means for indicating the tilt position of said material-handling implement comprising, cam means operatively connected to said material-handling implement and cam follower means formed by a pair of adjacent indicators pivotally mounted on said power loader for movement in adjacent parallel planes, said cam follower means engaging said cam means and operating to change the relative position of said indicator in response to the tilting movement of said material-handling implement.

8. In a vehicle mounted power loader having a boom pivotally connected at one end to the vehicle for movement in a longitudinal vertical arc, hydraulic means for moving said boom, a material-handling implement pivotally mounted at the other end of said boom for tilting movement in a longitudinal vertical arc, and hydraulic ram means for tilting said material-handling implement including a piston member and a cylinder member, means for indicating the tilt position of said material-handling implement comprising, a pair of adjacent indicators pivotally mounted on one of said hydraulic ram members for movement in adjacent parallel planes transverse to the axis of said piston and cylinder members, said indicators forming an aperture variable in size with the relative movement of the indicators, said indicators being biased toward opposite rotational movement tending to decrease the size of said apertures, and cam means carried by the other of said hydraulic ram members including an inclined cam surface projecting through said aperture, the edges of said aperture forming a cam follower slidably engaging said cam surface for movement of said indicators about their pivots relative to each other in response to the axial movement of the piston member relative to the cylinder member.

9. In a vehicle mounted power loader having a boom pivotally connected at one end to the vehicle for movement in a longitudinal vertical arc, hydraulic means for moving said boom, a material-handling implement pivotally mounted at the other end of said boom for tilting movement in a longitudinal vertical arc, and hydraulic ram means for tilting said material-handling implement including a piston member and a cylinder member, means for indicating the tilt position of said material-handling implement comprising, a pair of adjacent indicators pivotally mounted on said cylinder for movement about their pivots in adjacent parallel planes transverse to the axis of said piston and cylinder, said indicators forming an aperture variable in size with the relative movement of the indicators, said indicators being biased toward opposite rotational movement tending to decrease the size of the aperture, and an elongated cam member having one end operatively connected to the piston and extending parallel to the axis of the piston and adjacent to the cylinder and the other end forming inclined cam surfaces converging toward said end, said cam surfaces seating on the edge of said aperture with the piston extended, the cam surfaces slidably projecting through and expanding said aperture as the piston retracts into the cylinder, moving said indicators in opposite rotational directions relative to each other.

10. In a vehicle mounted power loader having a boom pivotally connected at one end to the vehicle for movement in a longitudinal vertical arc, hydraulic means for moving said boom, a material-handling implement pivotally mounted at the other end of said boom for tilting movement in a longitudinal vertical arc, and hydraulic ram means for tilting said material-handling implement including a piston member and a cylinder member, means for indicating the tilt position of said material-handling implement comprising, a pair of adjacent indicators pivotally mounted on said cylinder for movement about their pivots in adjacent parallel planes transverse to the axis of said piston and cylinder, each indicator forming opposite edges of an aperture extending transversely through said indicators, the aperture varying in size with the relative movement of the indicators, said indicators being biased toward opposite rotational movement tending to decrease the size of the aperture, and an elongated cam member having one end operatively connected to the piston and extending parallel to the axis of the piston adjacent to the cylinder, the other end forming opposite inclined cam surfaces converging toward the end, said opposite cam surfaces seating on opposite edges of said aperture with the piston extended, the cam surfaces slidably projecting through and expanding said aperture as the piston retracts into the cylinder, moving said indicators in opposite rotational directions about their pivots.

11. The invention defined in claim 10 wherein the cam member is longitudinally adjustably attached to a bracket carried by the piston for selectively varying the length of the cam member between the bracket and the cam surface end of said member.

12. In a vehicle mounted power loader having a boom pivotally connected at one end to the vehicle for movement in a longitudinal vertical arc, hydraulic means for moving said boom, a bucket pivotally mounted at the other end of said boom for tilting movement in a longitudinal vertical arc, said bucket being open toward the front and including a bottom, and hydraulic ram means for tilting said bucket including a piston member and a cylinder member, means for indicating the tilt position of said bucket comprising, a pair of adjacent indicators pivotally mounted on said cylinder for movement about their pivots in adjacent parallel planes transverse to the axis of said piston and cylinder, each indicator forming opposite edges of an aperture extending transversely through said indicators, the aperture varying in size with the relative movement of the indicators, said indicators being biased toward opposite rotational movement tending to decrease the size of the aperture, and an elongated cam member having one end operatively connected to the piston and extending parallel to the axis of the piston adjacent to the cylinder, the other end forming opposite inclined cam surfaces converging toward the end, said opposite cam surfaces seating on opposite edges of said aperture with the piston extended, the cam surfaces slidably projecting through and expanding said aperture as the piston retracts into the cylinder, moving said indicators in opposite rotational directions about their pivots.

13. The invention defined in claim 12 wherein the indicators are flat and have one end mounted on adjacent parallel pivots transverse to the flat surface, the opposite ends forming a pointer, each pointer having a straight edge on opposite sides which is alined with the straight edge of the opposite pointer when the bottom of the bucket is level, the pointer ends overlapping when the bucket bottom inclines downwardly toward the open edge, the pointers separating when the bucket bottom inclines upwardly toward the open edge.

References Cited by the Examiner

UNITED STATES PATENTS 506,787  10/1893  Mattice et al. _____ 116—127

HUGO O. SCHULZ, *Primary Examiner.*